United States Patent [19]
Suzuki et al.

[11] Patent Number: 5,689,104
[45] Date of Patent: Nov. 18, 1997

[54] OPTICAL CODE READER WITH DEVICES TO LOCATE A CODE IN A READING WINDOW

[75] Inventors: Masashi Suzuki, Mishima; Mitsuo Uchimura, Numazu, both of Japan

[73] Assignee: Kabushiki Kaisha TEC, Shizuoka, Japan

[21] Appl. No.: 528,950

[22] Filed: Sep. 15, 1995

Related U.S. Application Data

[63] Continuation of Ser. No. 212,702, Mar. 14, 1994, abandoned.

[30] Foreign Application Priority Data

Mar. 15, 1993 [JP] Japan ................. 5-054408

[51] Int. Cl.$^6$ ........................................ G06K 7/10
[52] U.S. Cl. ............................... 235/472; 235/462
[58] Field of Search ......................... 235/472, 462

[56] References Cited

U.S. PATENT DOCUMENTS

| | | | |
|---|---|---|---|
| 3,961,198 | 6/1976 | Aungst | 250/566 |
| 4,488,679 | 12/1984 | Bockholt et al. | 235/469 |
| 4,766,299 | 8/1988 | Tierney et al. | 235/472 |
| 4,900,907 | 2/1990 | Matusima et al. | 235/472 |
| 4,924,078 | 5/1990 | Sant'Anselmo | 235/494 |
| 4,972,475 | 11/1990 | Sant'Anselmo | 380/54 |
| 5,019,699 | 5/1991 | Koenck | 235/472 |
| 5,331,176 | 7/1994 | Sant'Anselmo et al. | 235/472 |
| 5,378,883 | 1/1995 | Batterman et al. | 235/472 |

FOREIGN PATENT DOCUMENTS

| | | | |
|---|---|---|---|
| 101939 | 3/1984 | European Pat. Off. | 235/462 |
| 147577 | 7/1987 | Japan | 235/472 |
| 2-268383 | 11/1990 | Japan . | |
| 4205580 | 7/1992 | Japan | 235/462 |
| 5-6451 | 5/1993 | Japan . | |

*Primary Examiner*—Donald T. Hajec
*Assistant Examiner*—Karl Frech
*Attorney, Agent, or Firm*—Frishauf, Holtz, Goodman, Langer & Chick

[57] ABSTRACT

An optical code reader is held in a hand of an operator and is brought near an article having a 2-dimensional code affixed thereto at the time of reading. The optical code reader includes a read window, a light source for illuminating an article via the read window, and a read control circuit for receiving light reflected by the article via the read window and detecting a 2-dimensional code from an image corresponding to the reflected light. The light source may include a guide beam projector for radiating guide light in a direction almost perpendicular to a read window plane, the guide light indicating a read range corresponding to the size of the read window on a plane parallel to the read window plane. Transparent cap may be provided at the read window for permitting a code on the article to be seen from the outside, while reducing external light entering the cap from the outside of the cap.

11 Claims, 8 Drawing Sheets

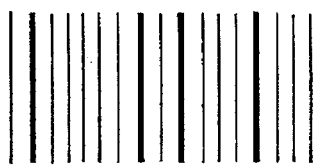
FIG. 1A
(PRIOR ART)
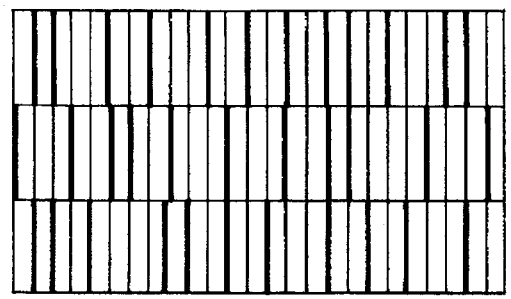
FIG. 1B
(PRIOR ART)
FIG. 1C
(PRIOR ART)
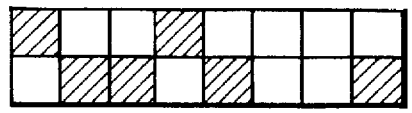
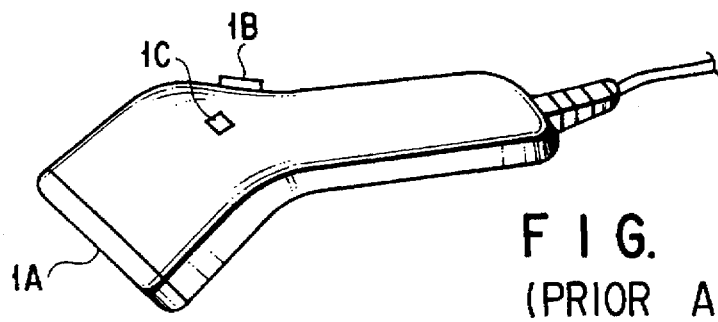
FIG. 2A
(PRIOR ART)
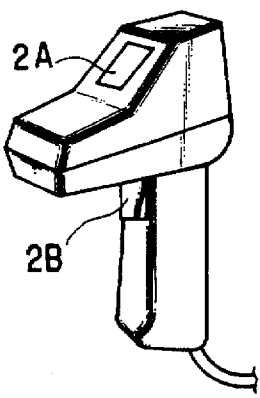
FIG. 2B
(PRIOR ART)
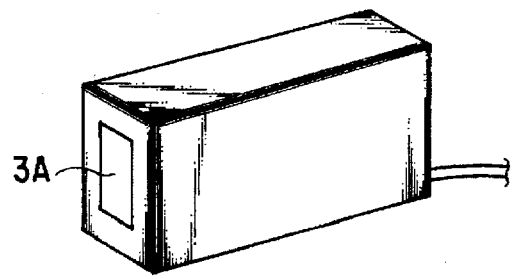
FIG. 2C
(PRIOR ART)

ated. A TV monitor 13 then
OPTICAL CODE READER WITH DEVICES TO LOCATE A CODE IN A READING WINDOW Application is a Continuation of application Ser. No. 08/212,702, filed Mar. 14, 1994 now abandoned.

BACKGROUND OF THE INVENTION

1. Field of the Invention

The present invention relates to an optic code reader for reading a 2-dimensional code affixed to an article and, more particularly, to an optical code reader which is held in a hand of an operator at the time of reading.

2. Description of the Related Art

In many supermarkets, article codes expressed in the form of bar codes are used for sales registration. FIG. 1A shows a bar code which is printed on the label of an article in advance and is read by a bar code scanner in sales registration. The bar code scanner detects an image of the bar code printed on the label of the article, and performs a read processing to obtain an article code from the detected image. This article code is supplied to an electronic cash register via a cable. The electronic cash register then performs a sales registration processing on the basis of the article code supplied from the bar code scanner.

FIG. 2A shows a touch type bar code scanner. In a bar code read operation, an operator holds the bar code scanner in his/her hand, and brings a read window 1A formed on the distal end of the bar code scanner into contact with the label of an article. In this state, the operator depresses a read switch 1B. This scanner has an LED light source and a line CCD inside the read window. These components operate together upon an operation of the read switch 1B. The LED light source illuminates the entire label. The line CCD then receives light reflected by a bar code printed on the label and detects a bar code image corresponding to the light. An LED indicator 1C is turned on when an article code is properly obtained from the bar code image detected by the line CCD, thus informing the operator of the completion of reading a code.

FIG. 2B shows a gun type bar code scanner. In a bar code read operation, an operator holds the bar code scanner in his/her hand, and directs a read window 2A formed on an upper portion of the bar code scanner to the label of an article. In this state, the operator depresses a read switch 2B. This scanner has a laser source and a line CCD inside the read window. These components operate together upon an operation of the read switch 2B. The laser source scans the label in one direction with a laser beam. The line CCD then receives light reflected by a bar code printed on the label and detects a bar code image corresponding to the light.

FIG. 2C shows a stationary type bar code scanner. In a bar code read operation, an operator holds an article in his/her hand, and directs the label of the article to a read window 3A of the bar code scanner fixed in advance. This scanner has a laser source and a line CCD inside the read window 3A. These components operate together all the time. The laser source scans the label in one direction with a laser beam. The line CCD then receives light reflected by a bar code printed on the label and detects a bar code image corresponding to the light.

The above-described bar code is used for article management not only in retail shops such as supermarkets but also in factories, distribution industry, service industry, and the like. With an increase in the number of application fields, article information other than an article code is also expressed in the form of a bar code, and the amount of information is increasing. However, the information capacity of a bar code is relatively small, and hence it is difficult to express a large amount of information in the form of a bar code. In order to overcome such a difficulty, 2-dimensional codes such as the multi-bar code shown in FIG. 1B and the matrix array code shown in FIG. 1C have been developed.

FIG. 3 shows a 2-dimensional code scanner for reading a 2-dimensional code. In this 2-dimensional code scanner, a TV camera 11 photographs a 2-dimensional code printed on a label 14 of an article under room illumination. An image processing unit 12 performs an image processing to obtain article information from an image of the 2-dimensional code photographed by the TV camera 11. A TV monitor 13 then displays the image Of the 2-dimensional code photographed by the TV camera 11.

This 2-dimensional code scanner is expensive, besides being relatively large and heavy. In addition, an operator must direct the label 14 of the article to the TV camera 11 without any inclination, and the focal point and aperture of the TV camera 11 must be adjusted before a read operation. Such a preparation for a read operation will delay start of a 2-dimensional code read operation.

SUMMARY OF THE INVENTION

It is an object of the present invention to provide an optical code reader which can reduce failures in a 2-dimensional code read operation performed while the reader is held in a hand of an operator.

The above object is achieved by an optical code reader which is held in a hand of an operator and is brought near to an article having a 2-dimensional code affixed thereto at the time of reading. The optical code reader includes a read window, a light source for illuminating an article via the read window, and a detection section for receiving light reflected by the article via the read window and detecting a 2-dimensional code from an image corresponding to the reflected light. The light source includes a guide beam projector for radiating guide light in a direction almost perpendicular to a read window plane, the guide light indicating a read range corresponding to a size of the read window on a plane parallel to the read window plane.

According to this optical code reader, an operator can bring the read window near an article while checking whether a 2-dimensional code on the article is located inside the read range. Therefore, failures in reading 2-dimensional codes can be reduced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1A to 1C are views respectively showing a bar code, a multi-bar code, and a matrix array code;

FIGS. 2A to 2C are perspective views respectively showing touch type, gun type, and stationary type bar code scanners;

DETAILED DESCRIPTION OF THE PREFERRED EMBODIMENTS

A 2-dimensional code scanner according to the first embodiment of the present invention will now be described with reference to FIGS. 4 to 9. In a read operation, this 2-dimensional code scanner is held in a hand of an operator and is brought near the label of an article on which a 2-dimensional code is printed.

Figure 3:
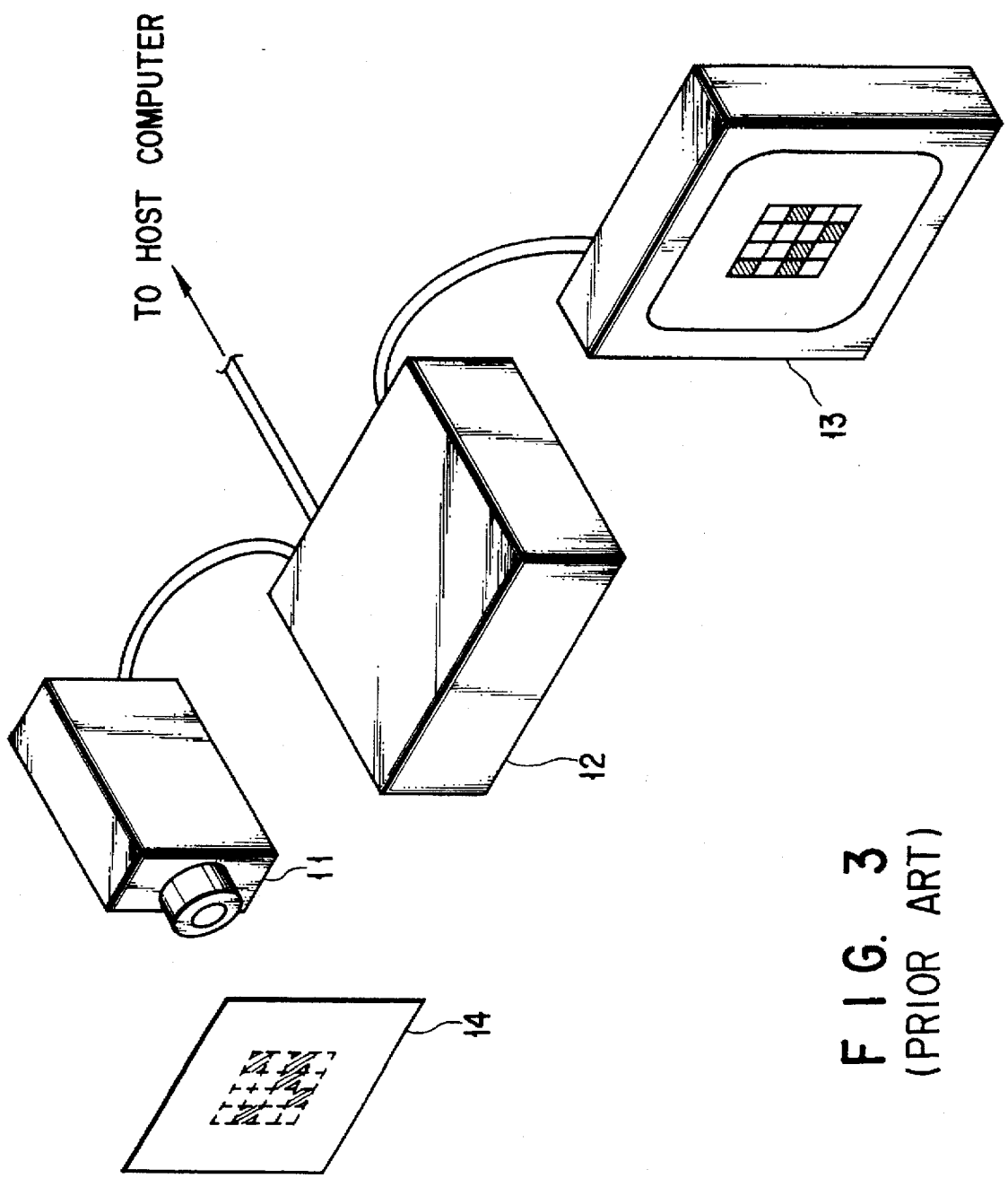
FIG. 3 is a perspective view showing a conventional 2-dimensional code scanner.
Figure 4:
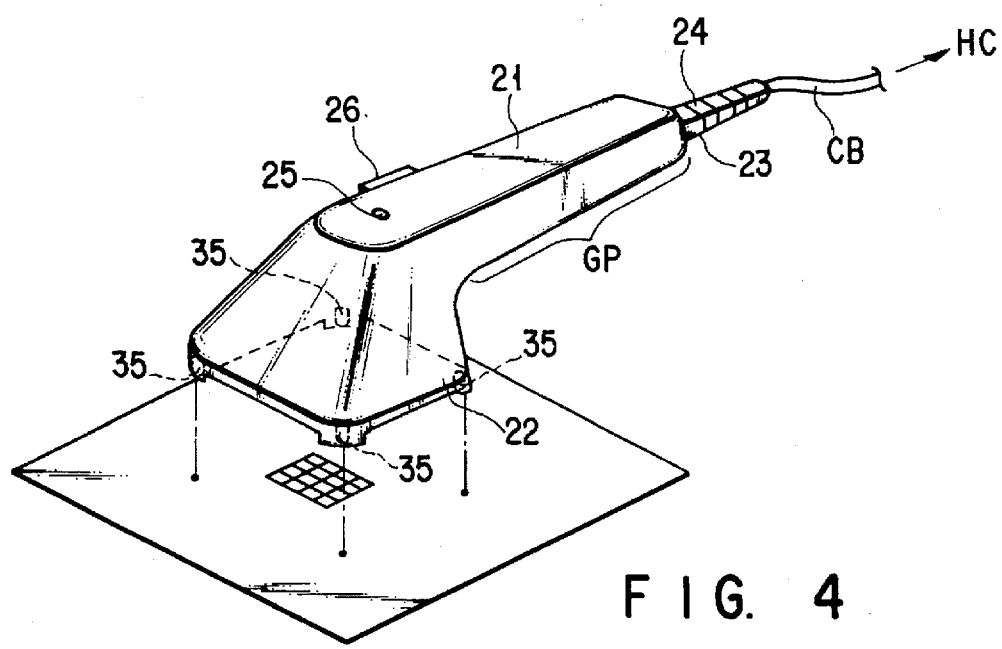
FIG. 4 is a perspective view showing a 2-dimensional code scanner according to the first embodiment of the present invention.
Figure 5:
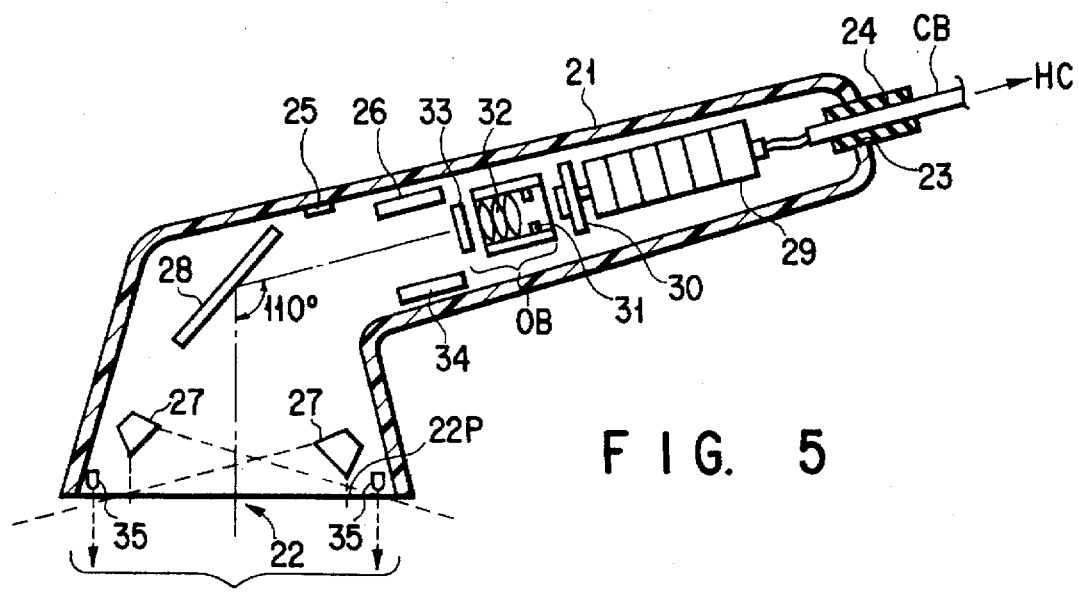
FIG. 5 is a sectional view showing the 2-dimensional code scanner in FIG. 4.

FIG. 4 shows the outer appearance of this 2-dimensional code scanner. FIG. 5 shows the internal structure of the 2-dimensional code scanner. The 2-dimensional code scanner has a plastic housing or frame 21. This housing or frame 21 is molded into the shape shown in FIG. 4, and its internal space is used to house various components, as shown in FIG. 5. The frame 21 has a 2-dimensional code read window 22 on its distal end, and also has an insertion port 23 formed in its proximal end to allow insertion of a cable CB for connecting the 2-dimensional code scanner to an external data processing unit, e.g., a host computer HC. The cable CB contains power lines and data lines. The cable CB is fixed in the insertion port 23 with a protective member 24. The proximal-end-side of the frame 21 is used as a grip portion GP. The read window 22 is a rectangular opening portion having a size slightly larger than that of a 2-dimensional code to be read. An axis perpendicular to a read window plane 22P is set at an angle of at least 90 degrees or more with respect to the central axis of the grip portion GP. The scanner further includes an LED indicator 25 exposed on the upper surface of the frame 21, and a read switch 26 protruding from a side surface of the frame 21. The read switch 26 is depressed by the operator to permit start of a 2-dimensional code read opoeration. The LED indicator 25 is turned on to inform the operator of the completion of a read operation.

In the internal space of the frame 21, an illumination light source 27, a deflecting mirror 28, a circuit board unit 29, an area CCD 30, an imaging optical system OB, and a buzzer 34 are arranged. The illumination light source 27 is disposed near the read window 22 to illuminate an entire 2-dimensional code facing the read window 22. This illumination light source 27 comprises a plurality of illumination LEDs and a plurality of plastic diffusion lenses associated with these illumination LEDs so as to uniformly radiate illumination light through the read window 22. The deflecting mirror 28 is disposed nearer to the proximal end than the illumination light source 27 and is set at a predetermined angle with respect to the read window plane 22P such that incident light which comes from a 2-dimensional code via the read window 22 is reflected toward the area CCD 30. The light reflected by the deflecting mirror 28 is guided to the light-receiving surface of the area CCD 30 by the imaging optical system OB so as to form an image. The imaging optical system OB comprises by an aperture stop mechanism 31, lens group 32, and a filter 33 arranged on an optical path connecting the deflecting mirror 28 and the area CCD 30. The filter 33 is used to attenuate unnecessary external light. The lens group 32 is used to sufficiently suppress the distortion of an image formed on the light-receiving surface of the area CCD 30. The aperture stop mechanism 31 is used to adjust the amount of transmitted light so as to obtain a proper brightness of an image. The focal point of the lens group 32 is set such that an image on the area CCD 30 has proper contrast for digitalization when the distance between the read window 22 and a label on which a 2-dimensional code is printed becomes 10 mm or less. Antireflection coating is performed on the lens group 32 to prevent the formation of a ghost due to surface reflection. The deflecting mirror 28, the filter 33, the lens group 32, and the aperture stop mechanism 31 are formed as one unit to minimize a shift in optical axis, and the unit is mounted on the frame 21. The buzzer 34 informs the operator of the occurrence of an error and the completion of a read operation by changing the tone and the number of times of sound production.

The area CCD 30 is a solid-state image pickup element for detecting an image formed through the imaging optical system OB and converting it into an electrical signal. The area CCD 30 has a large number of photo cells arranged on the light-receiving surface in the form of a matrix. The number of effective photo cells is set to be at least 250,000.

The circuit board unit 29 comprises a plurality of circuit boards, each having various electronic parts mounted on one or both surfaces. These electronic parts constitute a read control circuit together with the area CCD 30. This read control circuit is electrically connected to the LED indicator 25, the read switch 26, the illumination light source 27, and the buzzer 34, and is also electrically connected to a guide beam projector GD arranged inside the read window 22. This guide beam projector GD is used to radiate a plurality of guide beams on an article. These guide beams indicate a read range in which a 2-dimensional code can be read by the scanner. If a read operation is performed while part of a 2-dimensional code is located outside this read range, the reading of a code ends in failure.

Figure 6:
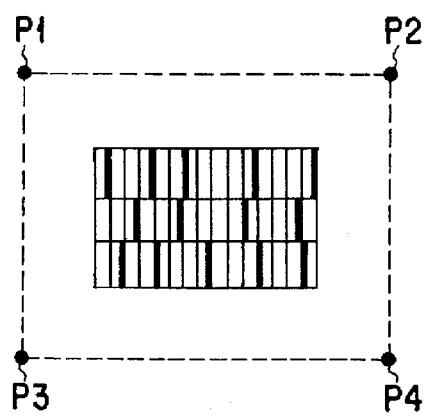
FIG. 6 is a view showing a read range indicated by four guide beams radiated on the surface of an article.

The guide beam projector GD comprises four beam LEDs 35 disposed in correspondence with the four corners of the read window 22 and designed to emit guide beams through the read window 22. The beam LEDs 35 are directed such that guide beams emitted therefrom become perpendicular to the read window plane 22P and parallel to each other. Each of these side beams is visible light having a brightness and a color which allow discrimination from illumination light from the illumination light source 27 and room illumination light. As shown in FIG. 6, the guide beams mark four spots P1 to P4 on the surface of an article which is parallel to the read window plane 22P in front of the read window 22. That is, the guide beams indicate a rectangular area enclosed with the spots P1 to P4 and having almost the same size as that of the read window 22, as a read range, on an article surface. If the label of the article is not parallel to the read window plane 22P, two opposing sides of this rectangular area are not parallel to each other.

Figure 7:
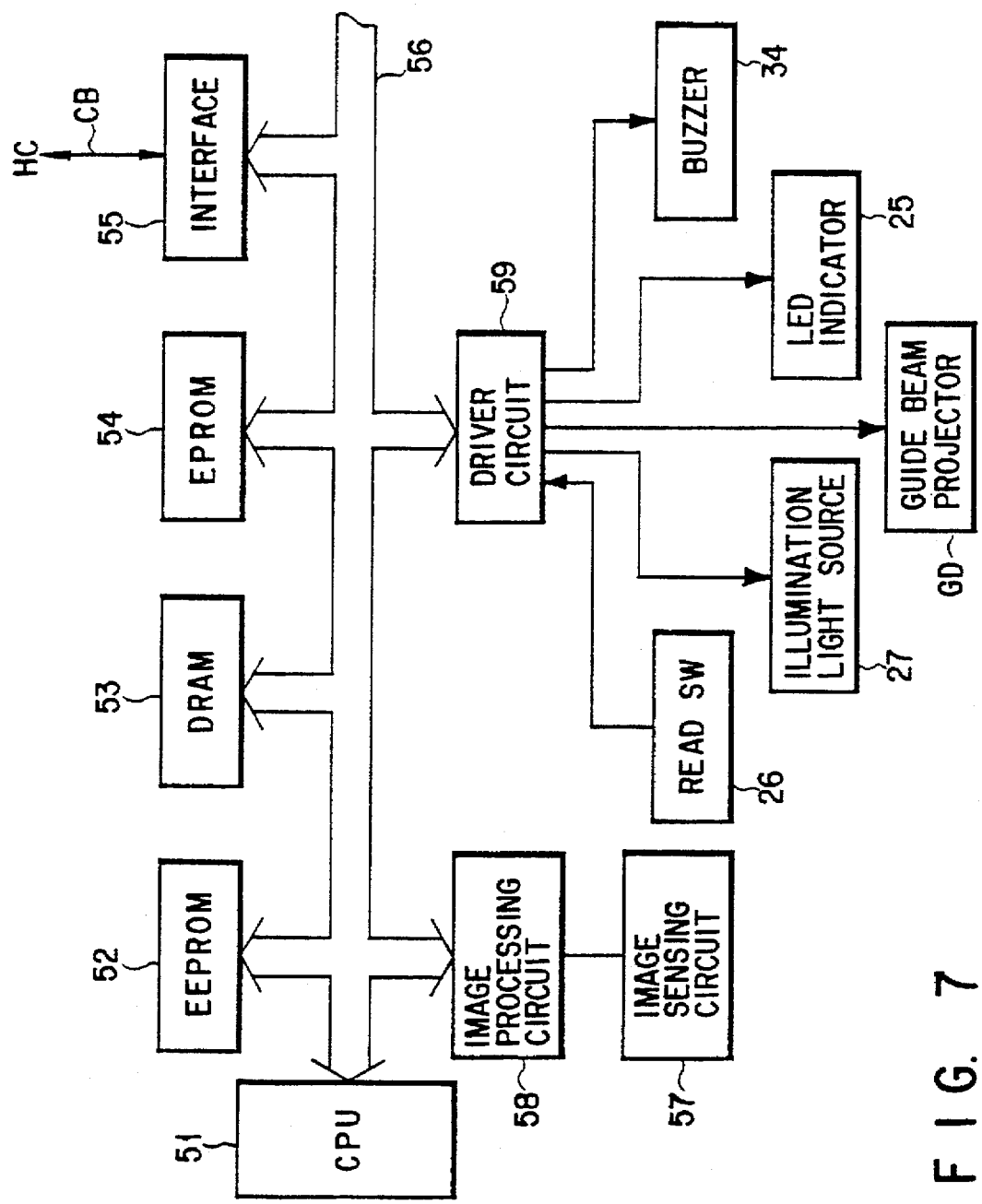
FIG. 7 is a block diagram schematically showing the arrangement of a read control circuit of the 2-dimensional code scanner in FIG. 4.

FIG. 7 schematically shows the arrangement of the read control circuit.

The read control circuit includes a CPU 51, an EEPROM 52, a DRAM 53, an EPROM 54, an input/output (I/O) interface 55, a bus line 56, an image sensing circuit 57, an image processing circuit 58, and a driver circuit 59. The CPU 51 is connected to the EEPROM 52, the DRAM 53, the EPROM 54, the input/output (I/O) interface 55, the image processing circuit 58, and the driver circuit 59 via the bus line 56. The image processing circuit 58 is connected to the image sensing circuit 57 incorporating the area CCD 30. The driver circuit 59 is connected to the LED indicator 25, the read switch 26, the illumination light source 27, the buzzer 34, and the guide beam projector GD. The interface 55 connected to the host computer HC via the cable CB. The CPU 51 performs a read control process of controlling the above-described various components to read a 2-dimensional code. The EEPROM 52 stores a control program for the read control process and initial setup data. The DRAM 53 temporarily stores various data. A plurality of memory areas are set in the DRAM 53 to store various data in the above read control process. The EPROM 54 stores conversion data for a decode processing of converting the black/white array data of a 2-dimensional code into article information. The interface 55 serves to communicate with the host computer HC via the cable CB. The image sensing circuit 57 detects an image formed on the area CCD 30, and outputs the image as an analog video signal. The image processing circuit 58 performs an image processing of converting the analog video signal output from the image sensing circuit 57 into bit-map image data, distinguishing a 2-dimensional code part from the background thereof in the image data, and producing black/white array data representing black and white sections arrayed in the 2-dimensional code part. This array data is converted into article information by the decode processing. The driver circuit 59 drives the LED indicator 25, the illumination light source 27, the buzzer 34, and the guide beam projector GD under the control of the CPU 51.

Figure 8:
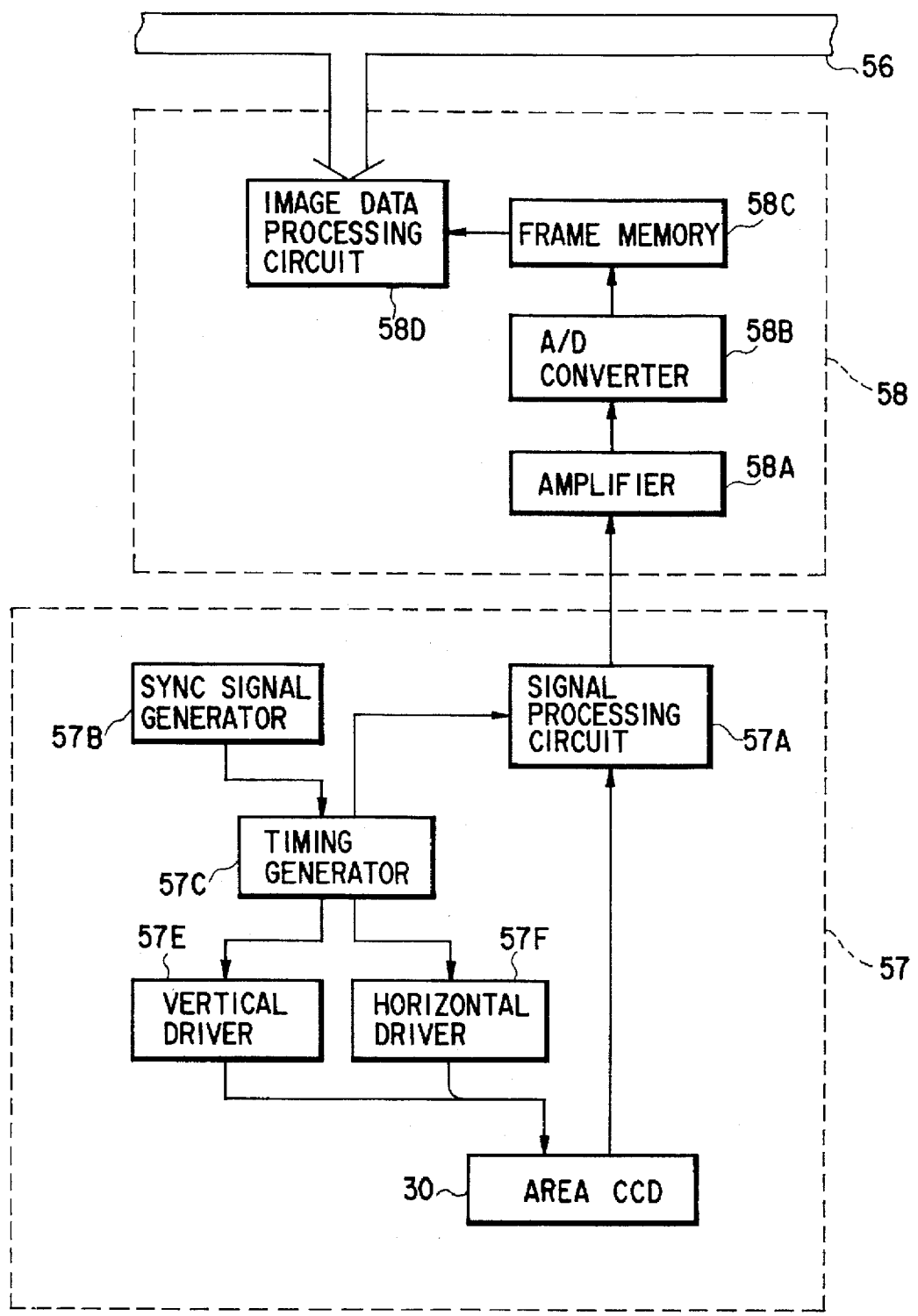
FIG. 8 is a block diagram showing an image sensing circuit and an image processing circuit in FIG. 7 in more detail.

FIG. 8 shows the image sensing circuit 57 and the image processing circuit 58 in more detail.

The image sensing circuit 57 comprises the area CCD 30, a video signal processing circuit 57A, a sync signal generator 57B, a timing generator 57C, a vertical driver 57E, and a horizontal driver 57F. In the area CCD 30, the respective photo cells generate charges in accordance with incident light, and the charges are transferred, as charge packets, to a charge detecting section. The charge detecting section generates an analog video signal in accordance with the charge amount of each charge packet. The sync signal generator 57B generates a sync signal serving as a reference clock for operating the area CCD 30. The timing generator 57C generates vertical and horizontal transfer timings of the charge packets synchronized with the reference clock from the sync signal generator 57B. The vertical and horizontal drivers 57E and 57F shift the charge packets in the column and row directions at the vertical and horizontal transfer timings, respectively. The signal processing circuit 57A amplifies the analog video signal output from the area CCD 30, and samples/holds a signal level in synchronism with the transfer timings, thereby wave-shaping the video signal.

The image processing circuit 58 includes an amplifier 58A, an A/D converter 58B, a frame memory 58C, and an image data processing circuit 58D. The amplifier 58A amplifies a video signal supplied from the signal processing circuit 57A, and supplies the signal to the A/D converter 58B. The A/D converter 58B performs an analog-to-digital conversion in which the amplified video signal is converted into digital data to be supplied to the frame memory 58C. The frame memory 58C has memory cells corresponding to the size of an image detected by the area CCD 30. A series of digital data supplied from the A/D converter 58B is stored in the frame memory 58C, as bit-map image data. The image data processing circuit 58D performs a density correction and emphasis processing on the bit-map image data stored in the frame memory 58C to distinguish a 2-dimensional code part from the background thereof in the bit-map image data, and performs a rotation and feature extraction processing on the image data of the 2-dimensional code part to produce black/white array data representing black and white sections arrayed in the 2-dimensional code part.

The CPU 51 obtains article information by performing a decode processing on the black/white array data supplied from the image data processing circuit 58D, and supplies the article information to the host computer HC via the interface 55.

Figure 9:
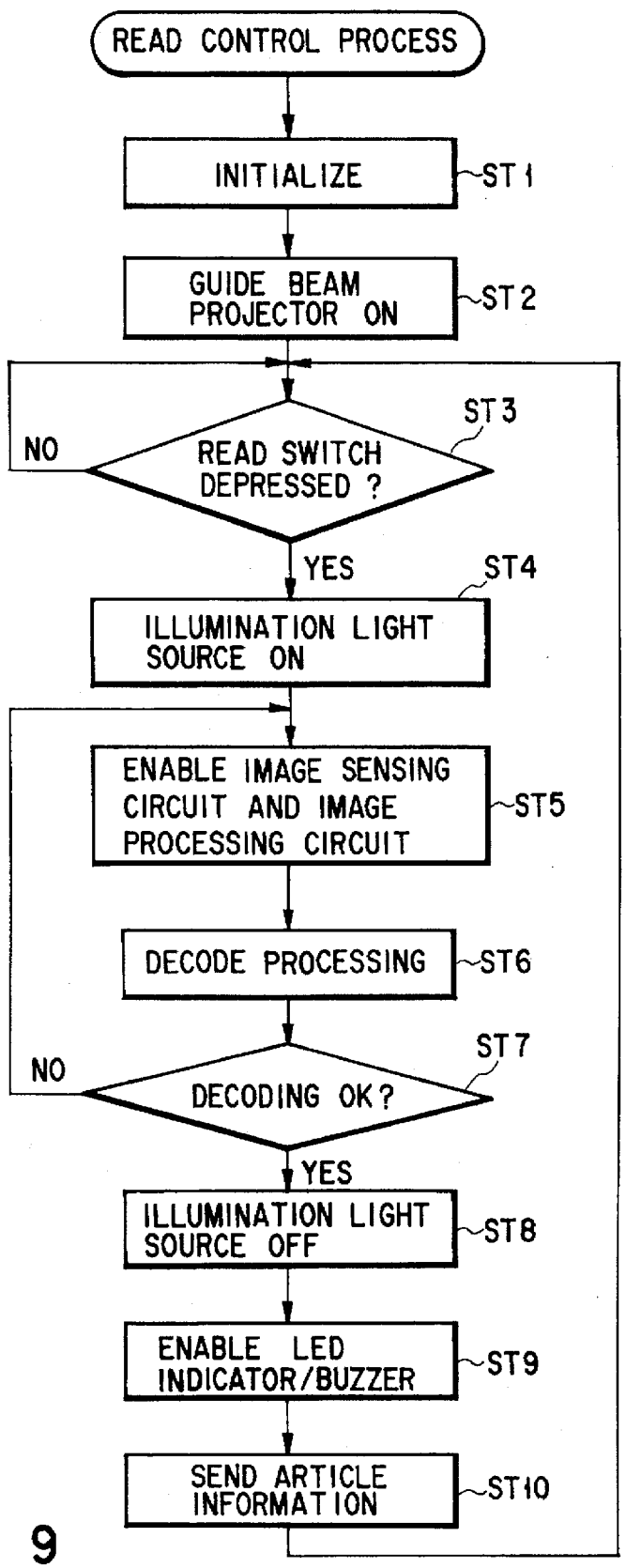
FIG. 9 is a flow chart showing a read control process performed in the operation of the 2-dimensional code scanner.

The operation of the 2-dimensional code scanner will be described below with reference to FIG. 9.

When the power switch of the host computer HC is turned on, power is supplied therefrom to the 2-dimensional code scanner. The CPU 51 performs a read control process of FIG. 9 upon supply of power. When this read control process is started, initialization is performed with respect to the DRAM 53, the image sensing circuit 57, the image processing circuit 58, and other components in step ST1. In step ST2, the guide beam projector GD is driven. In step ST3, it is checked whether the read switch 26 is depressed. Step ST3 is repeatedly executed until the operation of the read switch 26 is detected. As a result, the scanner is set in a standby state.

At the time of reading a 2-dimensional code printed on the label of an article, an operator holds the 2-dimensional code scanner in his/her hand, and brings the scanner near the label of the article. When the read window 22 is set in contact with the label or the distance therebetween falls within a range of 10 mm, the operator depresses the read switch 26. When this operation of the read switch 26 is detected, the CPU 51 turns on the illumination light source 27 in step ST4, and enables the image sensing circuit 57 and the image processing circuit 58 in step ST5.

When the illumination light source 27 illuminates the 2-dimensional code, light reflected by the 2-dimensional code is incident on the area CCD 30 via the read window 22, the deflecting mirror 28, and the imaging optical system OB. The area CCD 30 detects an image corresponding to this incident light, and outputs an analog video signal representing the image. The signal processing circuit 57A amplifies and wave-shapes the analog video signal output from the area CCD 30. The A/D converter 58B receives the analog video signal via the amplifier 58A, and A/D-converts it into digital data. When all the digital data are stored in the frame memory 58C as bit-map image data, the image data processing circuit 58D performs a density correction and emphasis processing on the image data stored in the frame memory 58C to distinguish a 2-dimensional code part from the background thereof in the bit-map image data, and performs a rotation and feature extraction processing on the image data of the 2-dimensional code part to produce black/white array data representing black and white sections arrayed in the 2-dimensional code part. The operations of the image sensing circuit 57 and the image processing circuit 58 are terminated when the black/white array data is supplied to the CPU 51.

The CPU 51 stores the black/white array data obtained from the image data processing circuit 58D in the DRAM 53, and performs a decode processing of converting the black/white array data into article information, in step ST6, on the basis of the conversion data stored in the EPROM 54. When it is detected in step ST7 that this decode processing is properly completed, the CPU 51 turns off the illumination light source 27 in step ST8. In step ST9, the CPU 51 operates at least one of the LED indicator 25 and the buzzer 34 to inform the operator of the completion of reading a code. In step ST10, the CPU 51 sends the article information to the host computer HC. Thereafter, the CPU 51 executes step ST3 to prepare for the next reading.

If it is detected in step ST7 that an error occurs in the decode processing, the CPU 51 executes step ST5 to read the 2-dimensional code again.

In the 2-dimensional code scanner of this embodiment, a 2-dimensional code is read by the cooperation of the illumination light source 27, the deflecting mirror 28, the imaging optical system OB, the area CCD 30, and the circuit board unit 29. These components are compact and lightweight. Hence, all the components can be housed in the frame 21, and the frame 21 incorporating the components can be held in a hand of an operator. In addition, this scanner has a simpler arrangement than a conventional 2-dimensional code scanner which reads a 2-dimensional code while an article is held in a hand of an operator. Therefore, the scanner of this embodiment can be manufactured at a low cost. Furthermore, reading of a 2-dimensional code is started immediately after the read switch 26 is depressed in a state that the read window 22 is brought near the label of an article. The focal point and the brightness of illumination light need not be changed from the initially set values before the start of reading. For this reason, the start of reading is not delayed by preparations for the code reading.

Since guide beams from the beam LEDS 35 indicate the read range of this scanner on an article surface, it can be easily checked whether a 2-dimensional code printed on the label is located inside the read range when the read window 22 is brought near the label of an article. Therefore, a read failure caused when part of the 2-dimensional code is located outside the read range can be reliably reduced.

The above-described embodiment can be variously modified.

For example, in place of the deflecting mirror 28, a prism may be used to change the traveling direction of light. In place of the lens group 32, an aspherical lens may be used to suppress the distortion of an image on the light-receiving surface of the area CCD 30. When a high-density 2-dimensional code is to be read, the number of effective photo cells of the area CCD 30 is preferably increased to 400,000 or more. In addition, the area CCD 30 may be replaced with another type of solid-state image pickup element.

The image processing circuit 58 need not produce black/white array data of a 2-dimensional code after distinguishing a 2-dimensional code part from the bit-map image data stored in the frame memory 58C. In this case, the CPU 51 stores the the image data of the 2-dimensional code part obtained from the image processing circuit 58 in the DRAM 53, and produces black/white array data according the image data stored in the DRAM 53.

In this embodiment, the guide beam projector GD has the four LEDs 35 assigned to the four corners of the read range. However, for example, the guide beam projector GD may have one LED assigned to the entire read range. A guide beam from this LED is radiated on an article surface such that the beam has almost the same area as that of the read window plane 22P on a plane parallel thereto. Alternatively, the arrangement of the illumination light source 27 may be changed to use illumination light as a guide beam as well. In this case, since the illumination light source 27 needs to be kept ON all the time, the guide beam projector GD is preferably arranged independently of the illumination light source 27, as in the embodiment.

Figure 10:
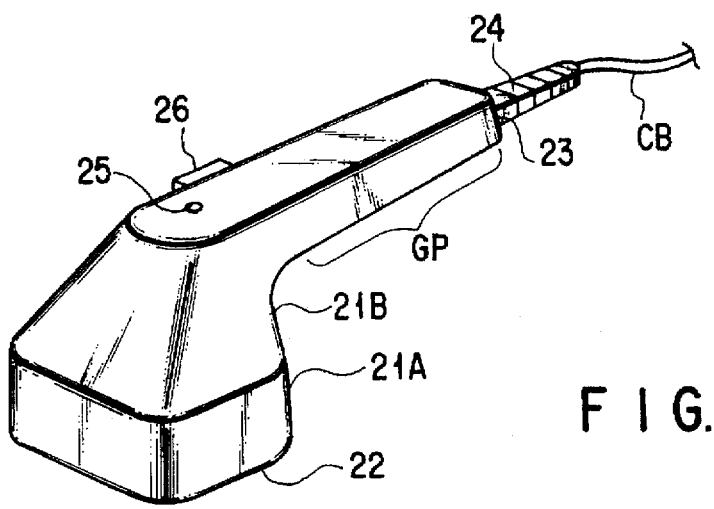
FIG. 10 is a perspective view showing a 2-dimensional code scanner according to the second embodiment of the present invention.
Figure 11:
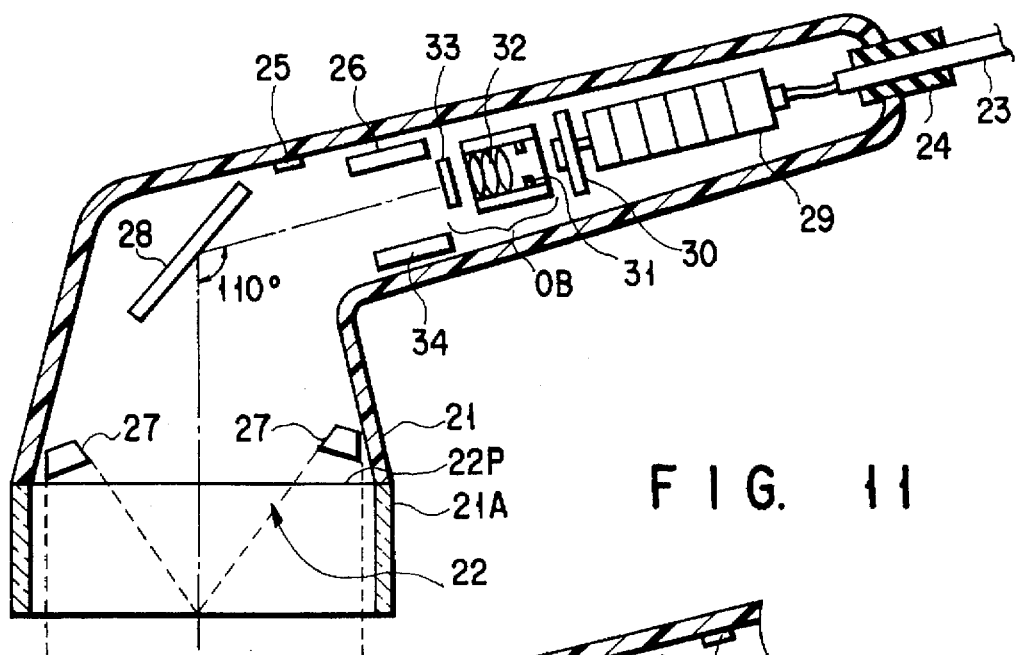
FIG. 11 is a sectional view showing the 2-dimensional code scanner in FIG. 10.

A 2-dimensional code scanner according to the second embodiment of the present invention will be described below with reference to FIGS. 10 to 13. The arrangement of the 2-dimensional code scanner of this embodiment is similar to that of the scanner of the first embodiment except for the following points. Therefore, the same reference numerals in the second embodiment denote the same parts as in the first embodiment, and a description thereof will be omitted. FIG. 10 shows the outer appearance of this 2-dimensional code scanner. FIG. 11 shows the internal structure of the 2-dimensional code scanner.

Figure 12:
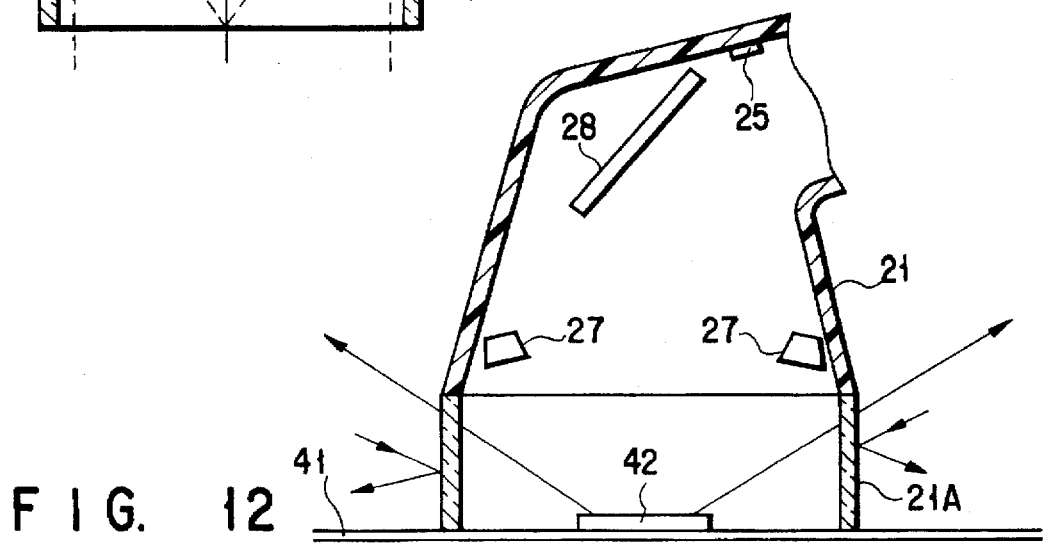
FIG. 12 is a sectional view showing light transmitted through a transparent cap in FIG. 10 while the transparent cap is almost in contact with the label of an article.

The 2-dimensional code scanner of FIGS. 10–13 has no guide beam projector GD. Instead, the scanner is designed such that an illumination light source 27 radiates illumination light serving as a guide beam for indicating a read range in a direction almost perpendicular to a read window plane 22P. The cross-section of the main portion of this illumination light, which is parallel to the read window plane 22P located within the range of distances of several centimeters from the read window 22, has almost the same area as that of the read window 22. In addition, the 2-dimensional code scanner has a transparent cap 21A disposed along the frame of the read window 22, as shown in FIG. 10. With this arrangement, while the transparent cap 21A is roughly in contact with a label 41 of an article, as shown in FIG. 12, a 2-dimensional code 42 on the label 41 can be seen from the outside through the transparent cap 21A. More specifically, the transparent cap 21A is made of a plastic material which allows light from the inside to be transmitted therethrough to the outside and which reduces external light to inhibit external light from entering the read window 22. With the use of the transparent cap 21A, the lens group 32 has a focal length which is adjusted in accordance with the height of the transparent cap 21A.

Figure 13:
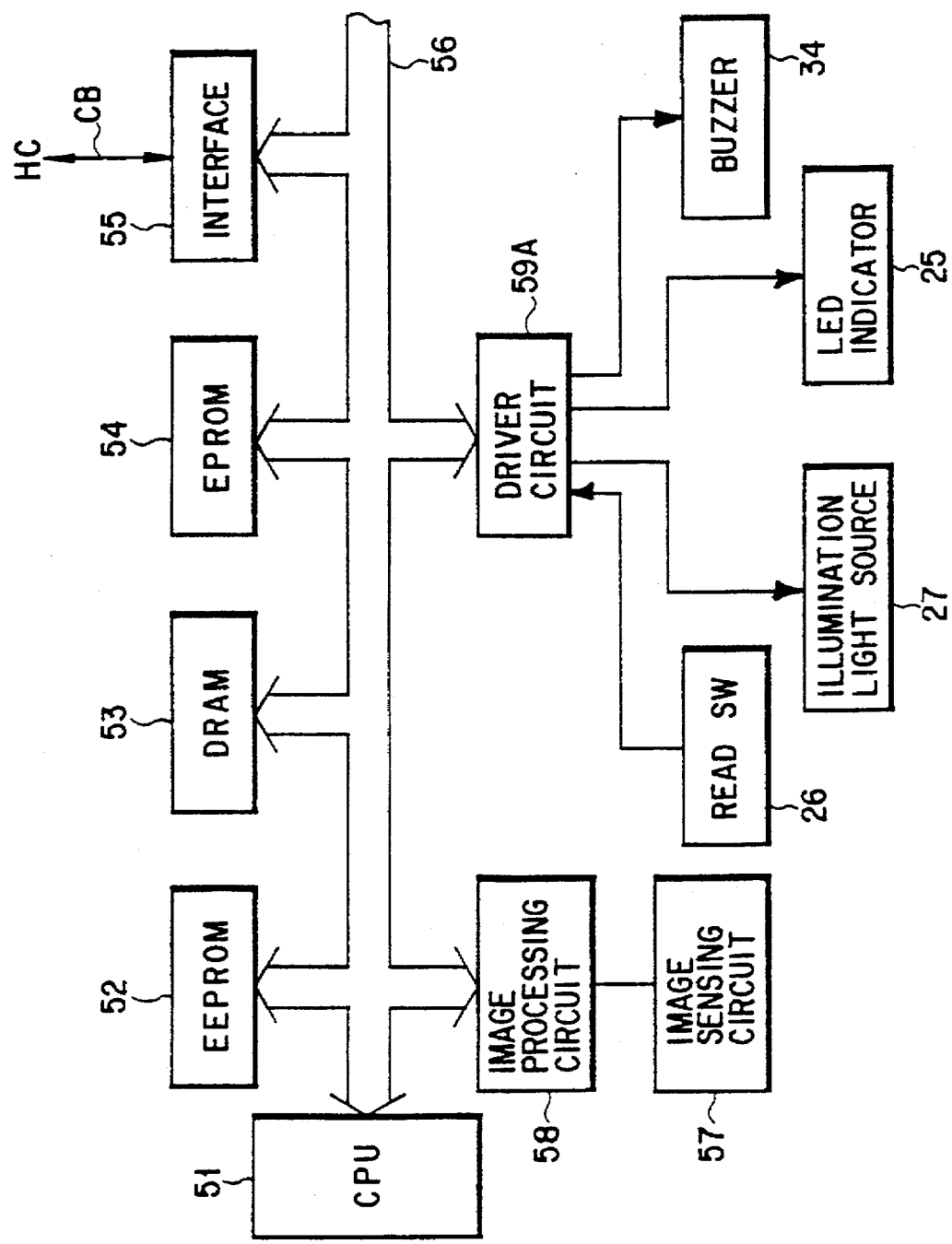
FIG. 13 is a block diagram schematically showing the arrangement of a read control circuit for the 2-dimensional code scanner in FIG. 10.

This 2-dimensional code scanner FIGS. 10–12 has a read control circuit shown in FIG. 13. This read control circuit is different from the one in the first embodiment in that a driver circuit 59A is connected to drive an LED indicator 25, an illumination light source 27, and a buzzer 34. A CPU 51 is designed to perform a read control process in which a control of the guide beam projector GD in the first embodiment is eliminated.

At the time of reading a 2-dimensional code printed on the label of an article, an operator holds the 2-dimensional code scanner in his/her hand and brings the read window 22 near the label of the article. When the transparent cap 21A is set in contact with the label or the distance therebetween falls within a range of 10 mm, the operator depresses the read switch 26. With this operation, the CPU 51 turns on the illumination light source 27 and enables an image sensing circuit 57 and an image processing circuit 58.

When the illumination light source 27 illuminates the 2-dimensional code, light reflected by the 2-dimensional code is incident on the area CCD 30 via the read window 22, the deflecting mirror 28, and the imaging optical system OB. The area CCD 30 detects an image corresponding to this incident light, and outputs an analog video signal representing the image. The signal processing circuit 57A amplifies and wave-shapes the analog video signal output from the area CCD 30. The A/D converter 58B receives the analog video signal via the amplifier 58A, and A/D-converts it into digital data. When all the digital data are stored in the frame memory 58C as bit-map image data, the image data processing circuit 58D performs a density correction and emphasis processing on the image data stored in the frame memory 58C to distinguish a 2-dimensional code part from the background thereof in the bit-map image data, and performs a rotation and feature extraction processing on the image data of the 2-dimensional code part to produce black/white array data representing black and white sections arrayed in the 2-dimensional code part. The operations of the image sensing circuit 57 and the image processing circuit 58 are terminated when the black/white array data is supplied to the CPU 51.

The CPU 51 stores the black/white array data obtained from the image data processing circuit 58D in the DRAM 53, and performs a decode processing of converting the black/white array data into article information on the basis of the conversion data stored in the EPROM 54. When it is detected that this decode processing is properly completed, the CPU 51 turns off the illumination light source 27, operates at least one of the LED indicator 25 and the buzzer 34 to inform the operator of the completion of reading a code, and then sends the article information to the host computer HC.

In the second embodiment, the same effects as those in the embodiment described above can be obtained. In addition, before depressing the read switch 26, the operator can check the location and orientation of a 2-dimensional code by seeing the code on a label through the transparent cap 21A. Therefore, if part of the 2-dimensional code is located outside the read range of the scanner, which is determined by the size of the read window 22, this positional error can be easily corrected. Therefore, failures in reading of the code can be reduced more effectively, and the code reading can be completed in a shorter period of time.

The illumination light source 27 emits illumination light having a wave length of 660 nm, for example. The transparent cap 21A used in the second embodiment may be made of a member which transmits only light having a wave length identical to that of the illumination light from the light source 27, a transparent member having a filter attached thereto to transmit only light whose wave length is identical to that of the illumination light from the light source 27, a simple transparent member, or a transparent member processed to inhibit external light from entering the area CCD.

Regarding the timing of reading a 2-dimensional code, the scanner can be arranged such that the illumination light source 27 is kept ON, and the image sensing circuit 57 and the image processing circuit 58 are enabled when the read switch 26 has been operated. Alternatively, the illumination light source 27 may be turned on upon operation of the read switch 26, and the image sensing circuit 57 and the image processing circuit 58 may be enabled when two to five seconds elapse after the illumination light source 27 is turned on, in consideration of the time required for positioning a 2-dimensional code within the transparent cap 21A.

Additional advantages and modifications will readily occur to those skilled in the art. Therefore, the invention in its broader aspects is not limited to the specific details and representative devices shown and described herein. Accordingly, various modifications may be made without departing from the spirit or scope of the general inventive concept as defined by the appended claims and their equivalents.

What is claimed is:

1. An optical code reader which is held in a hand of an operator and which is brought near an article having a 2-dimensional code affixed thereto at a time of reading of the code, said 2-dimensional code occupying an area, the optical code reader comprising:

a read window;

an illumination light source which emits an illumination light to simultaneously illuminate at least all of said area on the article via said read window;

a guide beam light source, separate and independent of said illumination light source, for emitting guide beams independently of said illumination light source, said guide beam light source including a plurality of light-emitting elements arranged along a frame of said read window, which light-emitting elements respectively emit parallel guide beams through said read window independently of a light intensity of said illumination light; and a detector arranged to receive light reflected by the article via said read window and to detect the 2-dimensional code from an image corresponding to the reflected light; and wherein said guide beams are perpendicular to a read window plane, said guide beams indicating a read range corresponding to a size of said read window on a plane substantially parallel to the read window plane, and wherein said illumination light source is located inside the frame of said read window, and the plurality of light-emitting elements of said guide beam light source are located between said illumination light source and the frame of said read window.

2. A reader according to claim 1, wherein said detector includes:

a read switch which is operated at the time of reading; and a controller for inhibiting said illumination light source from emitting illumination light before said read switch has been operated.

3. A reader according to claim 1, wherein said read window has a size larger than that of the 2-dimensional code.

4. A reader according to claim 1, wherein said read window has a size larger than that of the 2-dimensional code, and said detector includes an area CCD.

5. A reader according to claim 1, wherein said read window has a size larger than that of the 2-dimensional code, and said detector includes a solid-state image pickup element.

6. A reader according to claim 1, wherein said detector includes decoder means for decoding the detected 2-dimensional code.

7. A reader according to claim 1, wherein said read window is a rectangular opening.

8. A reader according to claim 1, wherein said guide beam light source includes four beam light-emitting elements respectively disposed in correspondence with four corners of said read window to emit respective guide beams through said read window.

9. A reader according to claim 8, wherein said guide beams emitted by said light-emitting elements have a brightness and a color such that said guide beams are discriminatable from said illumination light and from room illumination light.

10. A reader according to claim 1, wherein said guide beams emitted by said light-emitting elements have a brightness and a color such that said guide beams are discriminatable from said illumination light and from room illumination light.

11. An optical code reader according to claim 1, wherein said plurality of light-emitting elements are arranged such that the guide beams emitted thereby are located outside an effective read range of said detector which is not masked by said illumination light source in the read window.

* * * * *